United States Patent
Wallace et al.

(12)

(10) Patent No.: US 6,174,507 B1
(45) Date of Patent: Jan. 16, 2001

(54) ACID GAS SOLVENT FILTRATION SYSTEM

(75) Inventors: Paul S. Wallace, Katy; Kay A. Johnson, Missouri City; Delome D. Fair, Friendswood, all of TX (US)

(73) Assignee: Texaco Inc., White Plains, NY (US)

( * ) Notice: Under 35 U.S.C. 154(b), the term of this patent shall be extended for 0 days.

(21) Appl. No.: 09/092,324

(22) Filed: Jun. 5, 1998

Related U.S. Application Data

(60) Provisional application No. 60/048,784, filed on Jun. 6, 1997.

(51) Int. Cl.[7] ............................ C01B 17/16; C01B 31/20; C01B 17/20; C01B 17/02; C07C 1/02
(52) U.S. Cl. ...................... 423/229; 423/210; 423/242.7; 423/243.05; 423/576.4; 423/576.7; 252/373; 95/235; 95/236
(58) Field of Search .................................. 423/228, 210, 423/242.2, 242.7, 226, 243.02, 243.05, 576.2, 576.4, 576.7, 229; 95/156, 181, 183, 235, 236, 241; 252/373; 210/275

(56) References Cited

U.S. PATENT DOCUMENTS

| | | | |
|---|---|---|---|
| 3,935,105 | * 1/1976 | McEwen | 210/193 |
| 3,996,335 | 12/1976 | Wolk et al. | 423/210 |
| 4,039,619 | 8/1977 | Steiner | 423/230 |
| 4,052,176 | 10/1977 | Child et al. | 55/32 |
| 4,398,924 | 8/1983 | Hsieh et al. | 48/202 |
| 4,496,371 | 1/1985 | Urban et al. | 48/197 |
| 4,526,676 | 7/1985 | Seufert | 208/58 |
| 4,535,065 | 8/1985 | Klein et al. | 502/21 |
| 4,769,045 | 9/1988 | Grindley | 48/202 |
| 5,034,118 | 7/1991 | Bricker et al. | 208/238 |
| 5,133,954 | 7/1992 | Ranke et al. | 423/573.1 |
| 5,173,213 | * 12/1992 | Miller et al. | 252/394 |
| 5,220,782 | 6/1993 | Brown et al. | 60/39 |
| 5,250,083 | 10/1993 | Wolfenbarger et al. | 48/197 |
| 5,271,907 | 12/1993 | Copeland et al. | 422/178 |
| 5,289,676 | 3/1994 | Brown et al. | 60/39 |
| 5,389,351 | 2/1995 | Hasebe et al. | 423/242 |
| 5,447,702 | 9/1995 | Campbell et al. | 423/230 |
| 5,578,093 | 11/1996 | Campbell et al. | 481/128 |

FOREIGN PATENT DOCUMENTS

| | | | |
|---|---|---|---|
| 0 013 049 | 7/1980 | (EP) | 1/12 |
| 1 102 943 | 2/1968 | (GB) | 53/14 |

OTHER PUBLICATIONS

International Search Report dated Sep. 17, 1998 for PCT/US 98/11743.

* cited by examiner

*Primary Examiner*—Tom Dunn
*Assistant Examiner*—Maribel Medina
(74) *Attorney, Agent, or Firm*—Morris N. Reinisch; Howrey Simon Arnold & White

(57) ABSTRACT

The invention is a process for separating acid gases from synthesis gas and treating the resulting solids. A mixture comprising synthesis gas and acid gas is contacted with a fluid that reacts with said acid gas to form a particulate solid dispersed in a fluid. The slurry comprising fluid and particulate solid is filtered to separate the particulate solid from the fluid by means of a regenerable filter. The particulate solids are removed from the regenerable filter by backwashing with a back-washing fluid to form a pumpable slurry comprising a mixture of particulate solids and backwashing fluid. The slurry is gasified to form synthesis gas and vitrified solids.

11 Claims, No Drawings

ACID GAS SOLVENT FILTRATION SYSTEM

CROSS REFERENCE TO PATENTS

This application claims priority from provisional patent application serial No. 60/048,784 filed on Jun. 6, 1997, entitled ACID GAS SOLVENT FILTRATION SYSTEM.

FIELD OF THE INVENTION

The invention relates to removing acid gases from syngas, and more particularly to separating and recycling the resulting particulate solids to the gasification reactor.

BACKGROUND OF THE INVENTION

The production of syngas from the solid and liquid carbonaceous fuels, especially coal, coke, and liquid hydrocarbon feeds, has been utilized for a considerable period of time and has recently undergone significant improvements due to the increased energy demand. Syngas may be produced by heating carbonaceous fuels with reactive gases, such as air or oxygen, often in the presence of steam in a gasification reactor to obtain the fuel gas which is withdrawn from the gasification reactor. The syngas is then subjected to several cleansing operations to rid it of various contaminants which are formed or liberated from the feed during the gasification operation. These materials can readily become contaminate down stream process units if not properly treated during the gasification operation.

For example, materials often found in the syngas include hydrogen sulfide, ammonia, cyanides, and particulates in the form of carbon and trace metals. The extent of the contaminants in the feed is determined by the type of feed and the particular gasification process utilized as well as the operating conditions. In any event, the removal of these contaminants is critical to make gasification a viable process.

As the product gas is discharged from the gasifier, it is usually subjected to a cooling and cleaning operation involving a scrubbing technique wherein the gas is introduced into a scrubber and contacted with a water spray which cools the gas and removes particulates and ionic constituents from the syngas. The initially cooled gas may then be treated to desulfurize the gas prior to utilization of the product gas.

SUMMARY OF THE INVENTION

The invention is a process for separating acid gases from synthesis gas and treating the resulting solids. A mixture comprising synthesis gas and acid gas is contacted with a fluid that reacts with said acid gas to form a slurry of particulate solid dispersed in a fluid and synthesis gas. The slurry comprising fluid and particulate solid is separated from the synthesis gas in a conventional separator or by other means. The slurry is then filtered to separate said particulate solid from said fluid by means of a regenerable filter. The particulate solids are removed from the regenerable filter by back-washing with a back-washing fluid to form a pumpable slurry comprising a mixture of particulate solids and back-washing fluid.

DETAILED DESCRIPTION OF THE INVENTION

As used herein, a "fluid that reacts with acid gas" includes fluids that preferentially dissolve acid gases as well as fluids that contain one or more compounds that are either dissolved, dispersed, or suspended therein that react with acid gases. The fluid itself may be an inert.

As used herein, "acid gases" comprise hydrogen sulfide, carbon dioxide, or a mixture thereof. Other trace acid gases may be present. The fluid may react with one or both of these acid gases. Typical fluids may include an amine such as ethanolamine. The fluids may be solvents such as lower monohydric alcohols, such as methanol, or polyhydric alcohols such as ethylene glycol and the like.

As used herein, "synthesis gas" or "syngas" comprises gas comprising carbon monoxide, hydrogen, and occasionally inerts such as nitrogen.

As used herein, a "regenerable filter" is a filter that, as it becomes loaded and partially plugged with solids, can be regenerated. regeneration is usually accomplished by removing the filter from service, and then reversing the flow direction and back-washing particles from the filter face. The backwashed material is a slurry that is advantageously isolated from the process stream. Then, when sufficient material has been backwashed, the direction of flow is again reversed and the filter is put back into service.

The invention is a process for separating acid gases from synthesis gas and treating the resulting solids. Syngas may be produced by heating carbonaceous fuels with reactive gases, such as air or oxygen, often in the presence of steam in a gasification reactor to obtain the fuel gas which is withdrawn from the gasification reactor. The syngas so manufactured often contain contaminants such as acid gases. A mixture comprising synthesis gas and acid gas is contacted with a fluid that reacts with said acid gas to form a particulate solid dispersed in a fluid and synthesis gas. Contacting is usually in a counter-current bubble tray or packed tower, but any type of contacting, including jet scrubbers, reverse jet scrubbers, and venturi scrubbers may be used. The type of contacting apparatus is not important.

Similarly, the type of fluid that reacts with the acid gas is not important. There are many fluids, particulates, and suspensions known to the art to remove acid gases. See, for example, U.S. Pat. No. 4,039,619, U.S. Pat. No. 4,052,176, U.S. Pat. No. 4,496,371, U.S. Pat. No. 4,769,045, U.S. Pat. No. 5,289,676, and U.S. Pat. No. 5,447,702, the disclosures of which are incorporated herein by reference. The fluid may contain an amine such as diethanolamine, methanol, N-methyl-pyrrolidone, or a dimethyl ether of polyethylene glycol. The fluid may contain particulate iron, caustic salts, carbonates, iron oxides, nickel, nickel oxides, or a combination thereof.

The slurry comprising fluid and particulate solid is separated from the synthesis gas in a separation zone in a tower, in a conventional separator, or by other means. Separation of a slurry from a gas is well known in the art.

The slurry is then filtered to separate said particulate solid from said fluid by means of a regenerable filter. It is often advantageous to have pre-concentration steps such as settling in a settler or centrifuging to increase the solids load of the slurry prior to filtering. However, the slurry can be filtered without pre-concentration.

The slurry is filtered by being forced by a pressure drop through filters. The filters remove a fraction, often more than 70%, of the solids in the slurry. The filters allow fluid, and occasionally some solids, to pass through and be recycled to the contactor. As these solids accumulate on the filter, a filter cake is formed. The differential pressure increases until it reaches a point where flow though the filter in impaired. At some point before the filter is completely plugged, the filter is taken out of service.

The fluid that reacts with acid gas is expensive, so it may be advantageous to displace this fluid with a less expensive back-washing fluid. It is preferred to displace the fluid that reacts with acid gas through the filter in the same direction that the process normally flows, so as to not load the fluid that reacts with acid gas with solids. The fluid displacing the fluid that reacts with acid gas is not critical. The fluid that reacts with acid gas can be displaced with among other things water, a hydrocarbon, an alcohol, a gas, or a vapor. It is advantageous to displace the fluid that reacts with acid gas with the back-washing fluid.

The particulate solids are removed from the regenerable filter by back-washing with a back-washing fluid to form a pumpable slurry comprising a mixture of particulate solids and back-washing fluid. This slurry can be treated as waste or can be recycled to the gasification reactor wherein organics will be gasified, and the particulates will be vitrified, thereby rendering both environmentally harmless. The back-washing fluid should be compatible with its subsequent fate. The back-washing fluid can be water, a hydrocarbon, an alcohol, or other compatible fluid. Of course, it may be simplest and most economical to use fluid that reacts with acid gas as the back-washing fluid. The back-washing fluid need not necessarily be miscible with the fluid that reacts with acid gas, though it is often advantageous that it be so. Water is often preferred, since the water is inexpensive and may itself be a waste stream from another process.

The regenerable filter can be any type of back-washable filter. One preferred commercial embodiment is the sock filter. This is a fabric filter covering an interior support into which fluids can enter and be withdrawn. The process stream flows from outside the sock, through the fabric of the sock, and into the interior support. The solids accumulate on the outside of the sock until they are backwashed.

It is advantageous to have two or more socks capable of running in parallel in a system. A control system can place one filter off line by isolating it from the contactor. Then, advantageously, the fluid that reacts with acid gas can be displaced from the filter. Finally, fluid can be injected through the center support and outward through the sock at a velocity sufficient to remove the particulate solids. Then, the back-washing fluid is advantageously displaced by fluid that reacts with acid gas, and the filter is brought back into service.

It is advantageous that the slurry be pumpable. This reduces the handling costs, and allows easy recycling to the gasification reactor. The pumpable slurry is advantageously pumped back into the gasification reactor. The liquid and any organics are gasified in the reactor. The solids are vitrified, which stabilizes the solids for non-hazardous disposal.

What is claimed is:

1. A process for separating acid gases from synthesis gas comprising
    a) contacting a mixture comprising synthesis gas and acid gas with a fluid that reacts with said acid gas to form a particulate solid dispersed in a fluid and synthesis gas,
    b) separating the synthesis gas from a slurry comprising said fluid and said particulate solid,
    c) separating said particulate solid from said fluid by means of a regenerable filter,
    d) back-washing said particulate solid from said regenerable filter with a back-washing fluid to form a pumpable slurry comprising a mixture of particulate solids and back-washing fluid, and
    e) pumping said pumpable slurry to a gasification reactor wherein the slurry is gasified to form synthesis gas and vitrified solids.

2. The process of claim 1 wherein the fluid that reacts with acid gas comprises an amine.

3. The process of claim 1 wherein the particulate solid comprises iron sulfide.

4. The process of claim 1 wherein the back-washing fluid comprises water.

5. The process of claim 1 wherein the fluid that reacts with acid gas comprises an iron compound.

6. The process of claim 1 wherein the regenerable filter is a sock filter.

7. The process of claim 1 wherein a plurality of sock filters is employed in step (c).

8. The process of claim 1 wherein said separating of said particulate solid from said fluid is by means of at least one of at least two regenerable filters, and wherein said process is further comprising the step of controlling the process such that at least one filter is separating said particulate solid from said fluid that reacts with acid gas while at least one regenerable filter is backwashed.

9. The process of claim 1 wherein the fluid that reacts with said acid gas in step (a) is employed as said back-washing fluid in step (d).

10. The process of claim 1 wherein the back-washing fluid comprises a compound selected from the group consisting of a hydrocarbon, an alcohol, water, and mixtures thereof.

11. The process of claim 1 that further comprises displacing the fluid that reacts with said acid gas from the regenerable filter with a back washing fluid selected from the group consisting of a hydrocarbons, an alcohol, water, or combinations thereof, wherein the back-washing fluid is utilized prior to said back-washing.

\* \* \* \* \*